US011417221B2

(12) United States Patent
Schulze et al.

(10) Patent No.: US 11,417,221 B2
(45) Date of Patent: Aug. 16, 2022

(54) UNMANNED AERIAL VEHICLE ESCAPE ROUTE PLANNING

(71) Applicant: The Boeing Company, Chicago, IL (US)

(72) Inventors: Jonas Schulze, Darmstadt (DE); Michael Christian Büddefeld, Dreieich (DE); Hugo Eduardo Teomitzi, Darmstadt (DE)

(73) Assignee: The Boeing Company, Chicago, IL (US)

( * ) Notice: Subject to any disclaimer, the term of this patent is extended or adjusted under 35 U.S.C. 154(b) by 143 days.

(21) Appl. No.: 16/819,787

(22) Filed: Mar. 16, 2020

(65) Prior Publication Data

US 2021/0287558 A1 Sep. 16, 2021

(51) Int. Cl.
*G08G 5/00* (2006.01)
*B64C 39/02* (2006.01)
*B64D 1/08* (2006.01)
*B64D 45/00* (2006.01)
*G05D 1/10* (2006.01)
*G01C 21/20* (2006.01)

(52) U.S. Cl.
CPC ......... *G08G 5/0039* (2013.01); *B64C 39/024* (2013.01); *B64D 1/08* (2013.01); *B64D 45/00* (2013.01); *G01C 21/20* (2013.01); *G05D 1/1062* (2019.05); *G08G 5/0034* (2013.01); *B64C 2201/141* (2013.01); *B64D 2045/0085* (2013.01)

(58) Field of Classification Search
CPC .. G08G 5/0039; G08G 5/0034; B64C 39/024; B64C 2201/141; B64D 1/08; B64D 45/00; B64D 2045/0085; G05D 1/1062; G01C 21/20
See application file for complete search history.

(56) References Cited

U.S. PATENT DOCUMENTS

| | | | |
|---|---|---|---|
| 2007/0138345 A1* | 6/2007 | Shuster | G05D 1/106 244/186 |
| 2016/0009392 A1* | 1/2016 | Korhonen | G05D 1/0011 244/137.3 |
| 2018/0286252 A1* | 10/2018 | Park | G05D 1/0011 |
| 2021/0263537 A1* | 8/2021 | Belt | G08G 5/0034 |

* cited by examiner

*Primary Examiner* — James J Lee
*Assistant Examiner* — Shon G Foley
(74) *Attorney, Agent, or Firm* — Sage Patent Group

(57) ABSTRACT

A method includes separating a flight plan of a vehicle into a number of portions with each portion including a particular length that is determined based on a complexity of an environment where the flight plan takes place. The complexity of the environment is based on at least one of a set of factors including at least one of a terrain of the environment, one or more obstacles, one or more no-fly zones, or one or more no-landing zones within the environment. The method also includes determining an escape route for each portion of the flight plan. The escape route includes a route to a safe landing site in response to a failure of a system onboard the vehicle. The method additionally includes generating an escape route plan for the flight plan in response to all portions of the flight plan being assigned at least one escape route.

20 Claims, 7 Drawing Sheets

UNMANNED AERIAL VEHICLE ESCAPE ROUTE PLANNING

FIELD

The subject disclosure relates to unmanned aerial vehicles or other aircraft and more particularly to a method and system for unmanned aerial vehicle or other aircraft escape route planning.

BACKGROUND

Unmanned Aerial Vehicle (UAV) operations are expected to increase over the next years, including leisure and business operations, carried out manually steered in line of sight and automatic without human interference. With UAVs carrying payloads in urban areas in very low airspace, their ability to maneuver in case of engine failures or other failures is limited. The concept of ETOPS (Extended Operations) and downdrifts of commercial aircraft does not apply to UAVs, since reduced climb capabilities and obstacles need to be taken into consideration when finding a route to the nearest suitable landing site for the UAV.

SUMMARY

In accordance with an example, a method includes separating, by a processor, a flight plan of a vehicle into a number of portions with each portion including a particular length that is determined based on a complexity of an environment where the flight plan takes place. The complexity of the environment is based on at least one of a set of factors within the environment. The set of factors includes at least one of a terrain of the environment, one or more obstacles, one or more no-fly zones, or one or more no-landing zones within the environment. The method also includes determining, by the processor, an escape route for each portion of the flight plan of the vehicle. The escape route includes a route to a safe landing site in response to a failure of a system onboard the vehicle that requires the vehicle to land, drop a payload or both. The method additionally includes generating, by the processor, an escape route plan for the flight plan in response to all portions of the flight plan being assigned at least one escape route.

In accordance with another example, a system including a processor and a memory associated with the processor. The memory incudes computer-readable program instructions that, when executed by the processor causes the processor to perform a set of functions including separating a flight plan of a vehicle into a number of portions with each portion including a particular length that has been determined based on a complexity of an environment where the flight plan takes place. The complexity of the environment is based on at least one of a set of factors within the environment. The set of factors include at least one of a terrain of the environment, one or more obstacles, one or more no-fly zones, or one or more no-landing zones within the environment. The set of functions also include determining an escape route for each portion of the flight plan of the vehicle. The escape route includes a route to a safe landing site in response a failure of a system onboard the vehicle that requires the vehicle to land, drop a payload or both. The set of functions additionally include generating an escape route plan for the flight plan in response to all portions of the flight plan being assigned at least one escape route.

In accordance with an example and any of the preceding examples, wherein the method and system also include computing one or more escape route volumes around each landing site of one or more landing sites, wherein determining an escape route for each portion of the flight plan includes using the one or more escape route volumes.

In accordance with an example and any of the preceding examples, wherein computing the one or more escape route volumes includes using one or more of a plurality of inputs. The plurality of inputs include at least one of type data indicative of a type of the vehicle, normal performance data indicative of a normal performance model of the vehicle, degraded performance data indicative of a degraded performance model of the vehicle, first location data indicative of a location of a landing site, second location data indicative of a location of a no-fly-zone, third location data indicative of a location of a payload drop site to extend remaining battery power for operation of the vehicle, obstacle data, a micro weather forecast data, historical data associated with a history of micro weather, battery condition information, a deviation between planned and actual conditions during flight, or an uncertainty of any of the inputs.

In accordance with an example and any of the preceding examples, wherein the determining the escape route for each portion of the flight plan includes determining at least one four-dimensional (4D) escape route for each portion of the flight plan.

In accordance with an example and any of the preceding examples, wherein the at least one 4D escape route includes a volume defined by the portion of the flight plan and at least one closest landing site to the portion of the flight plan, changes to the volume as the vehicle moves along the portion of the flight plan, uncertainty in the plurality of inputs and deviation from the flight plan.

In accordance with an example and any of the preceding examples, wherein the method and system further include determining the flight plan of the vehicle using a set of navigation data.

In accordance with an example and any of the preceding examples, wherein the set of navigation data is indicative of at least one of a defined airway, a location of a suitable regular landing site, a location of a suitable emergency landing site, a location of a no-fly-zone, one or more no-landing zones, one or more payload drop sites, or a database of obstacles.

In accordance with an example and any of the preceding examples, wherein the method and system further comprising rerouting a particular portion of the flight plan in response to the particular portion not having an assigned escape route.

In accordance with an example and any of the preceding examples, wherein rerouting the particular portion of the flight plan includes rerouting the particular portion of the flight plan closer to a suitable landing site.

In accordance with an example and any of the preceding examples, wherein the method and system further include receiving current or updated data; and modifying the escape route plan based on the current or updated data.

In accordance with an example and any of the preceding examples, wherein the current or updated data is received by the vehicle and the escape route plan is modified by the vehicle.

In accordance with an example and any of the preceding examples, wherein the current or updated data is received by at least one of a ground station or another vehicle and the escape route plan is modified by at least one of the ground station or the other vehicle. The method and system further include transmitting a modified escape route plan to the vehicle.

In accordance with an example and any of the preceding examples, wherein the current or updated data comprises at least one of a change in a location of a landing site, a change in a location of a no-fly-zone, a change in a location of a payload drop site, a change in a database including obstacles, a change in a micro weather forecast, or a deviation between planned and actual conditions during flight.

In accordance with an example and any of the preceding examples, wherein the method and system further include executing the escape route plan in response to detecting a failure of a system onboard the vehicle that requires the vehicle to land, drop a payload or both.

In accordance with an example and any of the preceding examples, wherein executing the escape route plan includes landing the vehicle at a closest landing site based on the escape route plan.

In accordance with an example and any of the preceding examples, wherein executing the escape route plan includes: dropping a payload at a payload drop site based on a condition of the vehicle and the escape route plan; and landing the vehicle at a closest landing site based on the escape route plan.

In accordance with an example and any of the preceding examples, wherein the method and system further include: detecting a change in health of the vehicle; and modifying the escape route plan in response to detecting the change in the health of the vehicle, wherein modifying the escape route plan comprises modifying at least one of a particular escape route or a particular portion of the flight plan and an assigned escape route.

In accordance with an example and any of the preceding examples, wherein modifying the escape route plan is performed by the vehicle.

In accordance with an example and any of the preceding examples, wherein modifying the escape route plan is performed by a ground station or another vehicle.

The features, functions, and advantages that have been discussed can be achieved independently in various examples or may be combined in yet other examples further details of which can be seen with reference to the following description and drawings.

DETAILED DESCRIPTION

Figure 1:
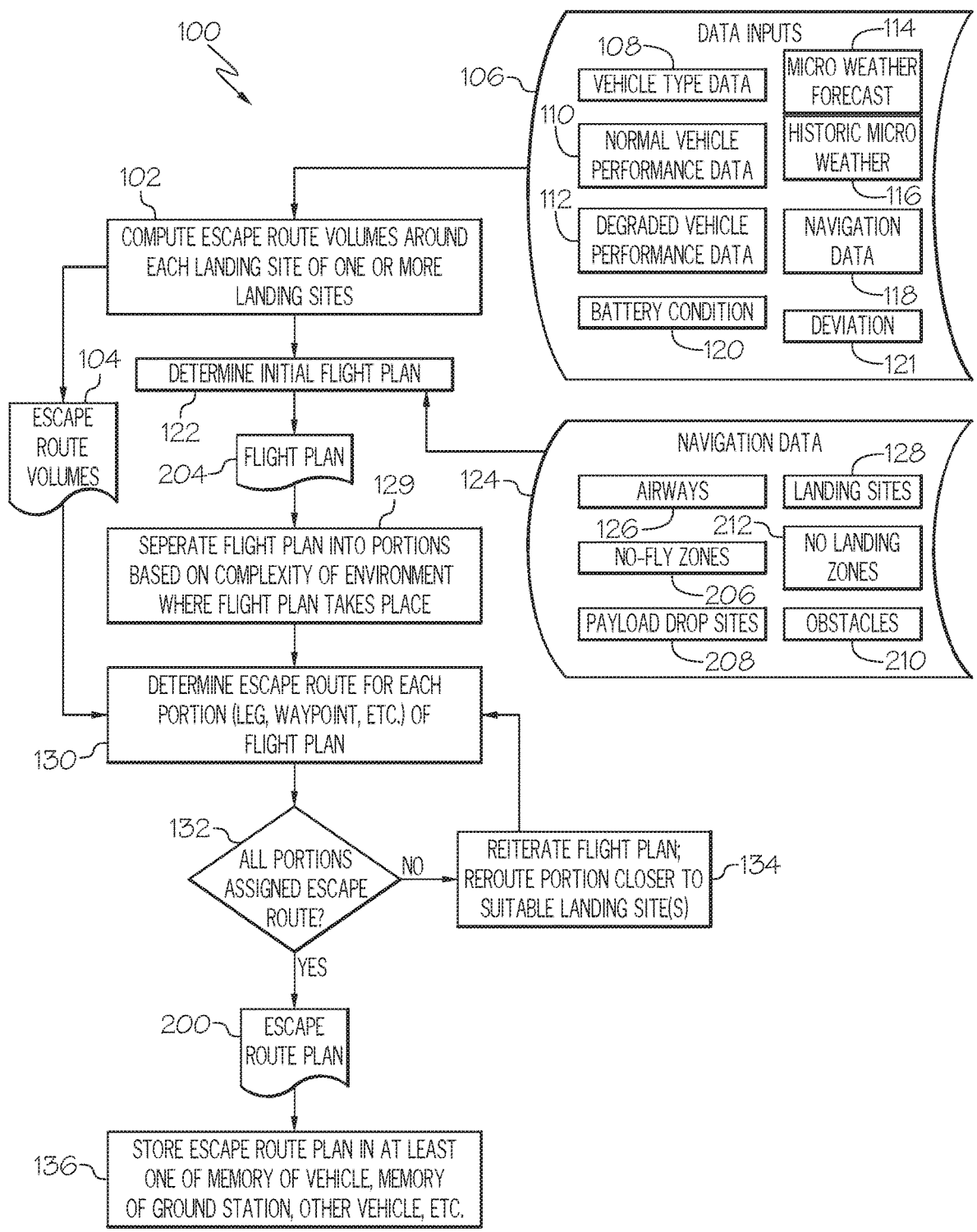
FIG. 1 is a flow chart of an example of a method for vehicle escape route planning in accordance with an example of the subject disclosure.

The following detailed description of examples refers to the accompanying drawings, which illustrate specific examples of the disclosure. Other examples having different structures and operations do not depart from the scope of the subject disclosure. Like reference numerals may refer to the same element or component in the different drawings.

The subject disclosure may be a system, a method, and/or a computer program product. The computer program product may include a computer readable storage medium (or media) having computer readable program instructions thereon for causing a processor to carry out aspects of the subject disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the subject disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the subject disclosure.

Aspects of the subject disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 is a flow chart of an example of a method 100 for vehicle escape route planning in accordance with an example of the subject disclosure. In block 102, one or more escape route volumes 104 are computed around each landing site 202 (FIG. 2) of one or more landing sites 202. An escape route volume 104 represents an infinite number of escape routes 214 (FIG. 2), which span up a volume in a particular air space. The volume constantly changes as a vehicle or UAV begins to move inside the escape route volume 104. For example, if a UAV needs to navigate around an obstacle, the UAV could go on either side of the obstacle or above the obstacle. Hence the escape route volume 104 encompasses the obstacle. If the performance of the UAV doesn't allow it to climb over the obstacle, the escape route volume 104 or volumes would only stretch sideways around the obstacle.

Figure 2:
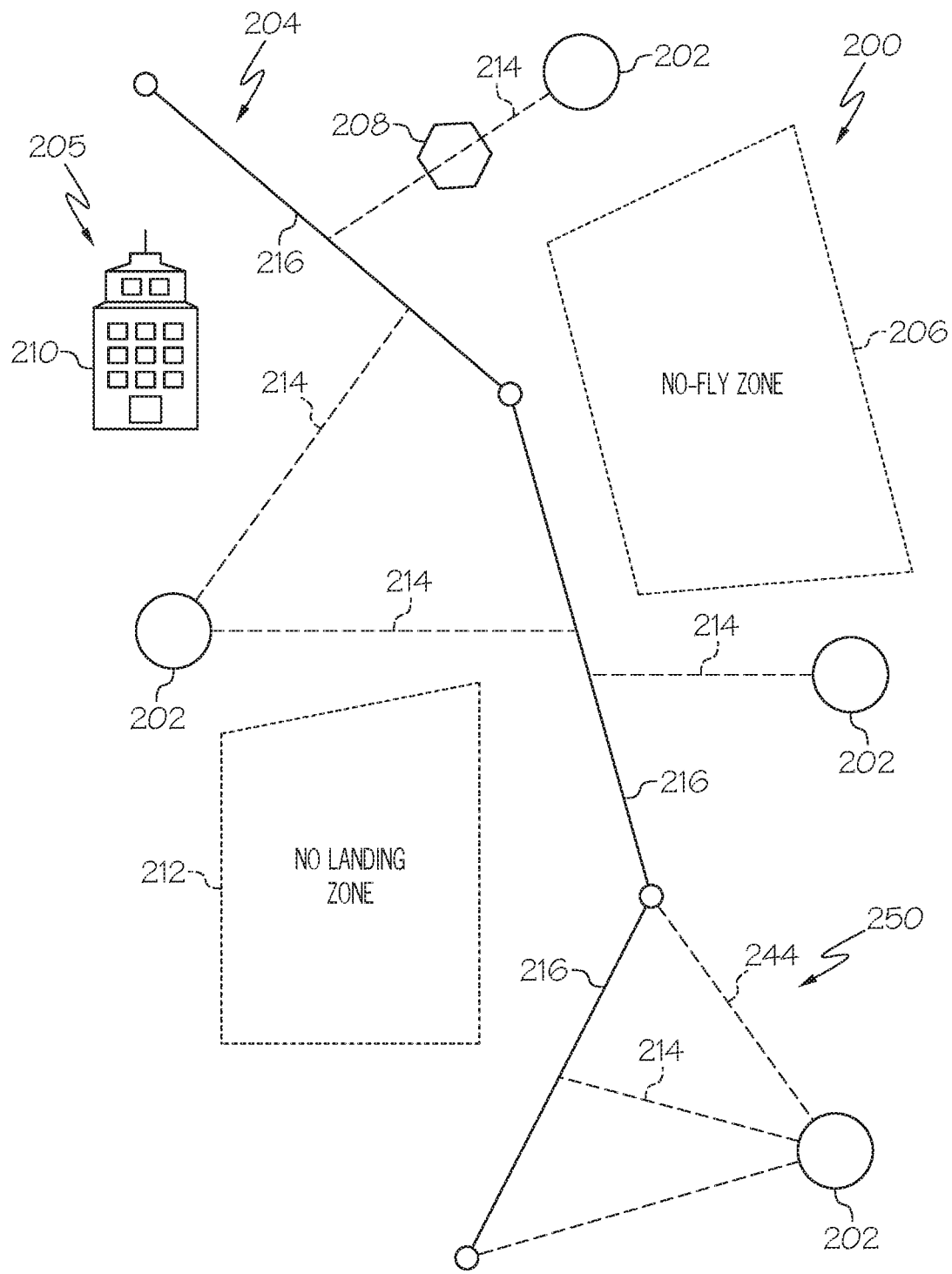
FIG. 2 is an illustration of an example of a vehicle escape route plan for a particular flight plan in accordance with an example of the subject disclosure.

Referring also to FIG. 2, FIG. 2 is an illustration of an example of a vehicle escape route plan 200 for a particular flight plan 204 in accordance with an example of the subject disclosure. Computing the one or more escape route volumes 104 includes using one or more of a plurality of inputs 106 (FIG. 1) or data inputs. Examples of the inputs 106 include but are not necessarily limited to vehicle type data 108 indicative of a type of vehicle, normal vehicle performance data 110 indicative of a normal performance model of the vehicle, degraded vehicle performance data 112 indicative of a degraded performance model of the vehicle, micro weather forecast data 114, historic micro weather data 116 associated with a history of micro weather, navigation data 118, battery condition information 120, a deviation 121 between planned and actual conditions during flight, or an uncertainty of any of the inputs 106. Examples of the navigation data 118 for computing the escape route volumes include but are not limited to first location data indicative of a location of a landing site 202, second location data indicative of a location of a no-fly-zone 206, third location data indicative of a location of a payload drop site 208 to extend remaining battery power for operation of the vehicle, and obstacle data 210.

In block 122, an initial flight plan 204 is determined using a set of the navigation data 124. The set of navigation data 124 is indicative of at least one of a defined airway 126, a location of one or more suitable regular landing sites 128, a location of one or more suitable emergency landing sites 202 (FIG. 2), a location of one or more no-fly-zones 206, one or more no-landing zones 212, one or more payload drop sites 208, and/or a database of obstacles 210.

In block 129, the flight plan 204 is separated into a number of portions 216 (FIG. 2) wherein the length of each portion 216 is determined based on a complexity of an environment 205 where the flight plan 204 takes place. The complexity of the environment 205 is based on at least one of a set of factors within the environment 205. The set of factors include but are not necessarily limited to a terrain of the environment 205, one or more obstacles 210, one or more no-fly zones 206, and one or more no-landing zones 212 within the environment 205. As an example, the set of factors can be received from a ground station or other vehicle and/or can be sensed by one or more sensors onboard the vehicle. In general, the length of portions 216 are expected to be smaller the higher the complexity of the environment 205 because in a complex environment 205 escape routes 214 are more complex too and will be valid for smaller portions 216 of the flight plan 204. An example for a flight plan 204 in a changing environment 205 is a flight plan 204 that departs in a suburban area, with a low density of housing, public facilities (e.g. schools, hospitals) and obstacles 210, but changes over to an urban area environment with high rising buildings and a high density of no-fly-zones 206. An example of a flight plan 204 taking place totally in an environment with a low complexity would be a flight plan 204 on an agricultural mission, where the vehicle or UAV can be expected to be allowed to land almost anywhere.

In block 130, an escape route 214 (FIG. 2) is determined for each portion 216 of a flight plan 204 of the vehicle. An escape route 214 is determined for each portion 216 of a flight plan 204 using the one or more escape route volumes 104. Each portion 216 of the flight plan 204 and one or more associated escape routes 214 are determined based on a complexity of the environment 205, e.g., buildings, terrain, or other obstacles that are present in the environment 205 through which the flight plan 204 extends. As previously described, the more complex the environment 205, the shorter the portions 216 of the flight plan 204 within the environment 205. Accordingly, in some examples, the portions of the flight plan 204 are determined as a function of obstacle density and dimensions or size of the obstacles within the environment through which the flight plan 204 extends. The escape route 214 includes a route to a safe landing site 202 in response to a failure of a system onboard the vehicle or UAV that requires the vehicle or UAV to land, drop a payload or both.

The portions 216 of the flight plan 204 and one or more escape routes 214 associated with each portion 216 are determined during creation of the original flight plan 204 and after detecting a failure that requires the vehicle or UAV to land or drop a payload to reach a safe landing site 202. The vehicle or UAV needs to have an "emergency" package or escape route plan 200 that can be used in case of a loss of communications (LOC) during flight. In some examples, the actual selection of a portion 216 and/or an escape route 214 are performed via onboard processing (e.g., using a processing system, such as system 500 in FIG. 5 onboard the vehicle or UAV) based on the original package or escape route plan 200 provided with the initial flight plan 204, actual conditions of the vehicle or UAV, and conditions of the environment at the time of the failure.

An escape route 214 is part of abnormal operations of a vehicle or UAV, and differentiates from alternate routes in that the escape route 214 end at a safe landing site, but not at the intended destination. Recalculations of the normal flight plan 204 would not be done onboard the UAV, while escape routes 214 support the UAV operation onboard the UAV even when all communication to the UAV is lost. Escape routes 214 are meant to provide a safe way to a safe landing in case of emergency (e.g., one or more system failures). They allow the UAV to "escape" from hazardous situations.

In the example in FIG. 2, the flight plan 204 includes one or more portions 216. A portion 216 of the flight plan 204 may also coincide with a leg between different geographic locations or a route between waypoints of a flight plan 204 of the vehicle but does not necessarily have to coincide with a leg or route between waypoints. In some examples, the flight plan 204 may be divided into portions 216 that have substantially equal lengths or distances or into portions that facilitate a shortest distance to landing sites 202 for escape routes 214 in the event of a failure, reduced performance or incident requiring the vehicle to execute the escape route plan 200.

In some examples, determining an escape route 214 for each portion 216 of the flight plan 204 includes determining at least one four-dimensional (4D) escape route 244 for each portion 216 of the flight plan 204. A 4D escape route 244 includes a volume 250 defined by the portion 216 of the flight plan 204 and at least one closest landing site 202 to the portion 216 of the flight plan 204. Changes to the volume 250 occur as the vehicle moves along the portion 216 of the flight plan 204 and because of uncertainty in the plurality of inputs 106 and deviation from the flight plan 204. 4D escape routes 244 include time as a fourth dimension, with mandatory temporal constraints. This enables the escape route calculation to take into account, e.g., remaining battery life dependent on flight times.

In block 132, a determination is made if all portions 216 of the flight plan 204 have been assigned at least one escape route 214. If not, the method 100 advances to block 134. In block 134, the flight plan 204 is reiterated or reworked. Reiterating or reworking the flight plan 204 includes rerouting portions 216 of the flight plan 204 closer to one or more suitable landing sites 202 until all portions 216 of the flight plan 204 have been assigned at least one escape route 214. A particular portion 216 of the flight plan 204 is rerouted in response to the particular portion 216 not having an assigned escape route 214. Rerouting the particular portion 216 of the flight plan 204 includes rerouting the particular portion 216 of the flight plan 204 closer to a suitable landing site 202.

An escape route plan 200 is generated for the flight plan 204 in response to all portions 216 of the flight plan 204 being assigned at least one escape route 214. In block 136, the escape route plan 200 is stored in at least one of a memory 612 (FIGS. 6-7) of the vehicle 602, a memory 706 (FIG. 7) of a ground station 702, or a memory 710 of another vehicle 704.

Figure 3:
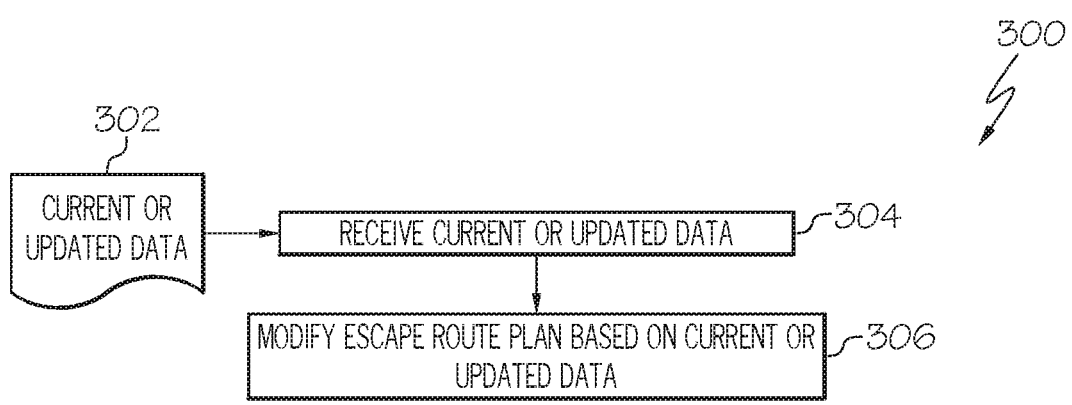
FIG. 3 is a flow chart of an example of a method for modifying a vehicle escape route plan based on current or updated data in accordance with an example of the subject disclosure.

FIG. 3 is a flow chart of an example of a method 300 for modifying a vehicle escape route plan 200 based on current or updated data 302 in accordance with an example of the subject disclosure. In block 304, current or updated data 302 is received. The current or updated data 302 is any current or updated data 302 for the data inputs 106 or set of navigation data 124. In block 306, the escape route plan 200 is modified based on the current or updated data 302. In some examples, the current or updated data 302 is received by the vehicle 602, as illustrated in the example in FIG. 6, from a source 604 and the escape route plan 200 is modified by the vehicle 602. In some examples, the vehicle 602 is an unmanned aerial vehicle. In other examples, the current or updated data 302 is received by at least one of a ground station 702 or another vehicle 704, as illustrated by the example in FIG. 7, and the escape route plan 200 is modified by at least one of the ground station 702 or the other vehicle 704. In the example in FIG. 7, the method 300 further includes transmitting a modified escape route plan 200 to the vehicle 602. In some examples, the current or updated data 302 includes at least one of a change in a location of a landing site 202, a change in a location of a no-fly-zone 206, a change in a location of a payload drop site 208, a change in a database including obstacles 210, a change in a micro weather forecast 114, or a deviation 121 between planned and actual conditions during flight.

Figure 4:
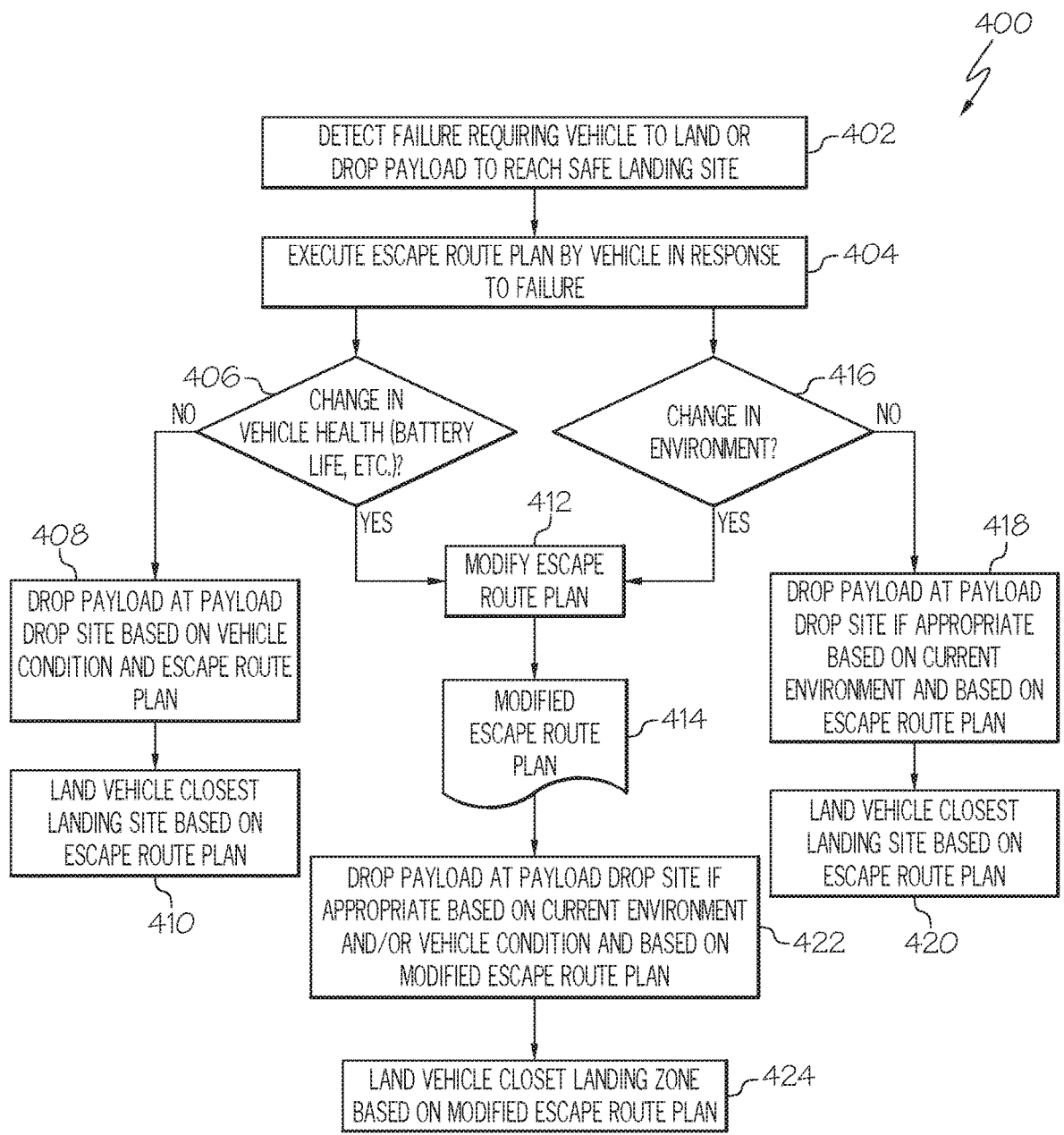
FIG. 4 is a flow chart of an example of a method for performing a vehicle escape route plan by a vehicle in accordance with an example of the subject disclosure.

FIG. 4 is a flow chart of an example of a method 400 for performing a vehicle escape route plan 200 by a vehicle 602 in accordance with an example of the subject disclosure. In block 402, a failure or other anomaly associated with a system onboard a vehicle 602 is detected that requires the vehicle 602 to land as soon as possible or drop a payload to reach a safe landing site 202 and to avoid loss of the vehicle 602.

In block 404, the escape route plan 200 is executed in response to detecting the failure or other anomaly of a system onboard the vehicle 602 that requires the vehicle 602 to land or drop a payload to reach a safe landing site 202. In some examples, executing the escape route plan 200 includes landing the vehicle 602 at a closest landing site 202 based on the escape route plan 200. In other examples, executing the escape route plan 200 includes dropping a payload at a payload drop site 208 based on a condition of the vehicle 602 and the escape route plan 200 and landing the vehicle 602 at a closest landing site 202 based on the escape route plan 200.

In block 406, a determination is made whether a change in the health of the vehicle 602 is detected. The health of the vehicle 602 is defined as the operational state of the vehicle 602, such as a faltering or failed engine, loss of communications, loss of navigational capability, reduced battery life before requiring a charge, or other change that affects the operation of the vehicle 602 and/or ability of the vehicle 602 to complete its mission or to fly to a landing site 202 based on the escape route plan 200.

The method 400 advances to block 408 in response to no change in the health of the vehicle 602 being detected. In block 408, the payload is dropped at a payload drop site 208 based on a condition of the vehicle 602 and the escape route plan 200. In block 410, the vehicle 602 is landed at a closest landing site 202 based on the escape route plan 200.

If a change in the health of the vehicle 602 is detected in block 406, the method 400 advances to block 412 in response to detecting the change in health of the vehicle 602. In block 412, the escape route plan 200 is modified to generate a modified escape route plan 414 in response to detecting the change in the health of the vehicle 602. Modifying the escape route plan 200 includes modifying at least one of a particular escape route 214 or a particular portion 216 of the flight plan 204 and the assigned escape route 214.

In block 416, a determination is made whether a change in the environment associated with the flight plan 204 has occurred. A change in the environment can be a change in anything. Examples of changes in the environment include but are not necessarily limited to a change in the weather forecast, that make the formerly planned escape routes 214 no longer feasible, airspace closures, mass gatherings of people that should not be flown over, etc. Some changes in the environment are determined by onboard sensors, e.g., wind velocity and wind direction sensors, an air temperature sensor, camera, etc. Other changes in environment are determined by and received from a ground station or other vehicle.

The method 400 advances to block 418 in response to no change in the environment being detected. In block 418, the payload is dropped at a payload drop site 208, if appropriate, based on the current environment and based on the escape route plan 200. In block 420, the vehicle 602 is landed at the closest landing site 202 based on the escape route plan 200.

If a change in the environment associated with the flight plan 204 is detected in block 416, the method 400 advances to block 412 in response to the change in the environment being detected. In block 412, the escape route plan 200 is modified to generate a modified escape route plan 414 in response to the change in the environment being detected. As previously described, modifying the escape route plan 200 includes modifying at least one of a particular escape route 214 or a particular portion 216 of the flight plan 204 and an assigned escape route 214. In some examples, modifying the escape route plan 200 is performed by the vehicle 602. In other examples, modifying the escape route plan 200 is performed by a ground station 702 or another vehicle 704 as described with reference to FIG. 7.

In block 422, the payload is dropped at a payload drop site 208, if appropriate, based on the current environment and/or vehicle condition based on the modified escape route plan 414. In block 424, the vehicle 602 is landed at the closest landing site 202 based on the modified escape route plan 414.

Figure 5:
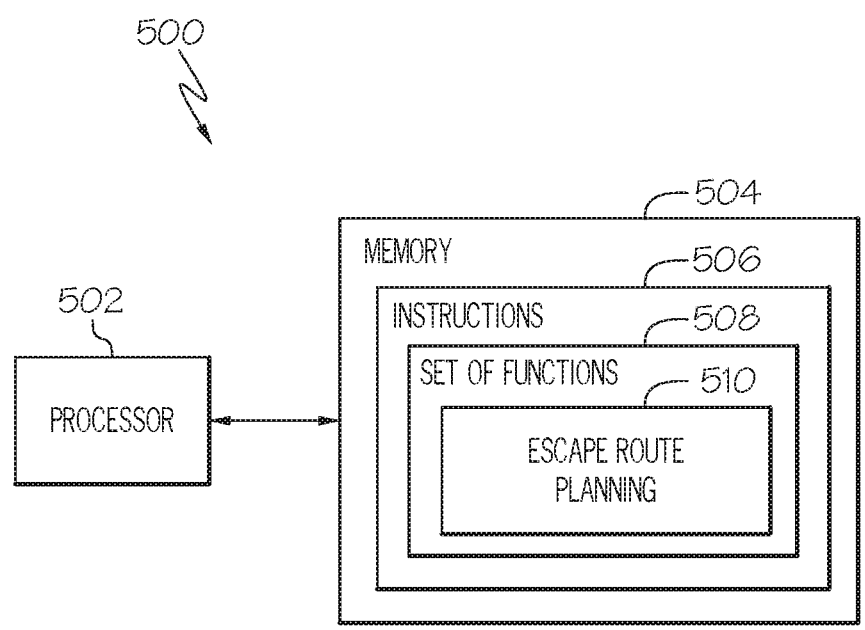
FIG. 5 is a block schematic diagram of an example of a system for vehicle escape route planning in accordance with an example of the subject disclosure.

FIG. 5 is a block schematic diagram of an example of a system 500 for vehicle escape route planning in accordance with an example of the subject disclosure. In some examples, the method 100 in FIG. 1 is embodied in and performed by the system 500. The system 500 includes a processor 502 and a memory 504 associated with the processor 502. The memory 504 includes computer-readable program instructions 506 that, when executed by the processor 502 causes the processor 502 to perform a set of functions 508. In some examples, the set of functions 508 include the functions for the method 100 for escape route planning 510 as described with reference to FIG. 1.

Figure 6:
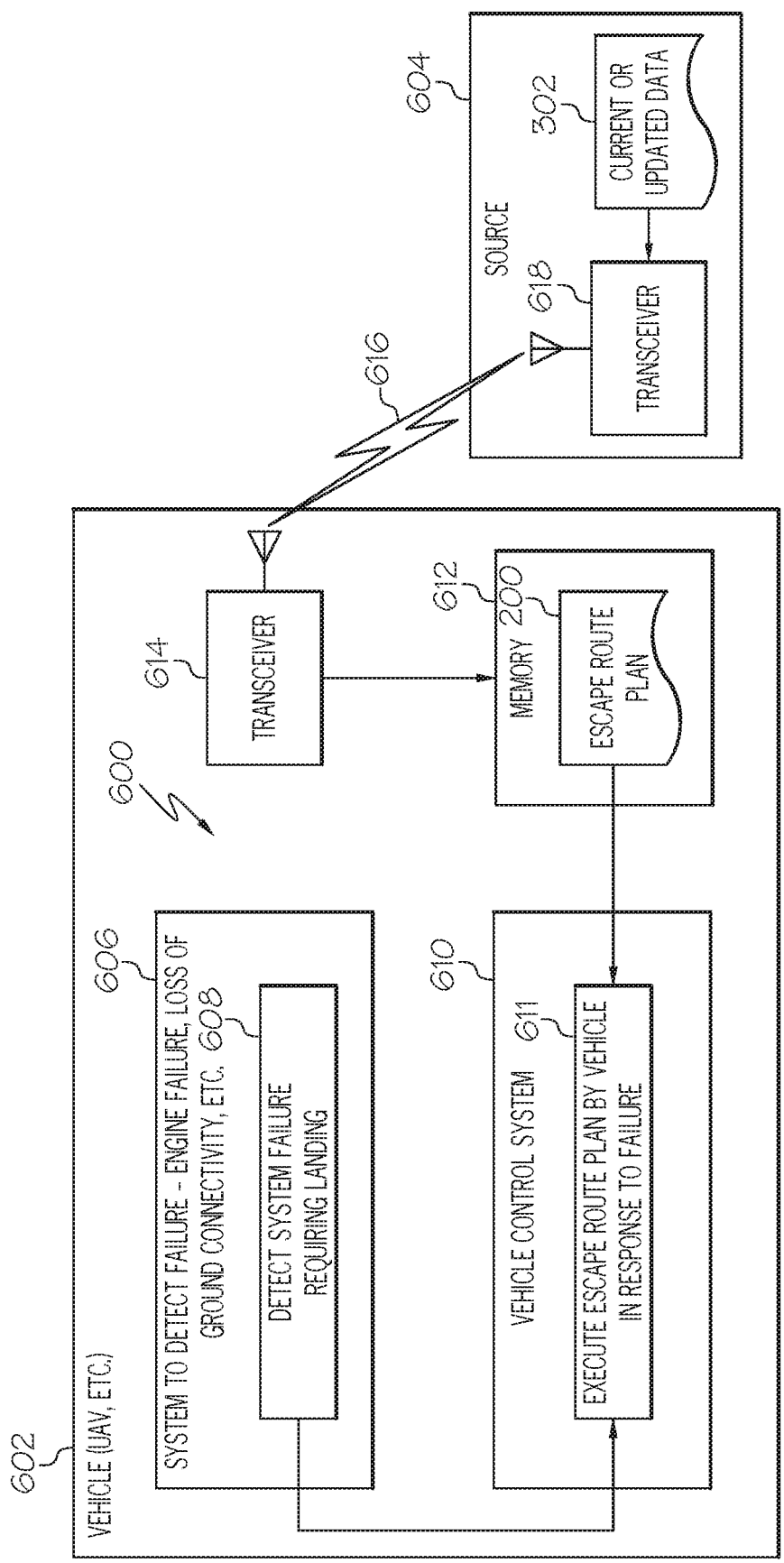
FIG. 6 is a block schematic diagram of an example of a vehicle including a system for executing an escape route plan in accordance with an example of the subject disclosure.

FIG. 6 is a block schematic diagram of an example of a vehicle 602 including a system 600 for executing an escape route plan, such as escape route plan 200 in FIG. 2, in accordance with an example of the subject disclosure. In some examples, the vehicle 602 is an unmanned aerial vehicle. In other examples, the vehicle 602 is another type of vehicle. The system 600 includes a system 606 configured to detect 608 a failure or an anomaly associated with another system of the vehicle 602. Examples of the failure or anomaly detected include but are not necessarily limited to abnormal operation of an engine or an engine failure, loss of communications with a ground station or another vehicle, reduced battery life or any other system abnormality of failure requiring landing of the vehicle 602.

The vehicle 602 also includes a vehicle control system 610. The vehicle control system 610 is configured to execute 611 the escape route plan 200 in response to detecting the abnormal operation or failure of another system of the vehicle 602 that requires landing the vehicle 602.

The vehicle 602 also includes a memory 612 and a transceiver 614. The escape route plan 200 is stored in the memory 612. The transceiver 614 is configured to receive signals 616 from a source 604. The source 604 includes a transceiver 618 for transmitting and receiving signals 616 from the vehicle 602 and other sources or vehicles. In some examples, the source 604 transmits current or updated data 302 to the vehicle 602 to modify the escape route plan 200 similar that previously described. In other examples, the initial escape route plan 200 is transmitted to the vehicle 602 by the source 604. In some examples, the source 604 is a ground station or another vehicle.

Figure 7:
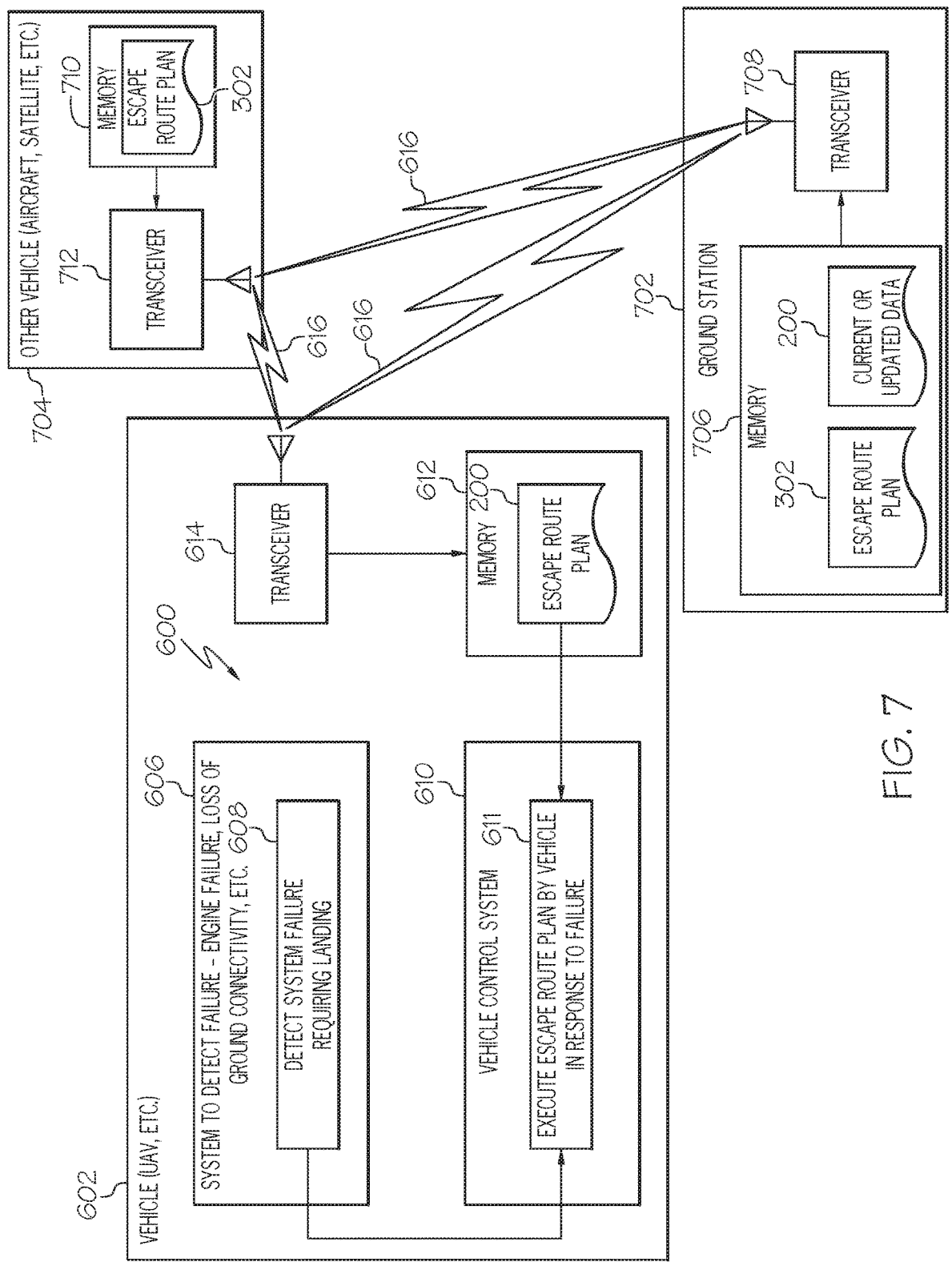
FIG. 7 is a block schematic diagram of an example of a vehicle including a system for executing an escape route plan and at least one of a ground station and another vehicle in communication with the vehicle in accordance with an example of the subject disclosure.

FIG. 7 is a block schematic diagram of an example of a vehicle 602 including a system for executing an escape route plan 200 and at least one of a ground station 702 and another vehicle 704 in communication with the vehicle 602 in accordance with an example of the subject disclosure. In some examples, the other vehicle is an aircraft, satellite or other type of vehicle. The vehicle 602 is similar to or the same as the vehicle 602 described with reference to FIG. 6. The ground station 702 includes a memory 706 and a transceiver 708. The escape route plan 200 and current or updated data 302 are stored in the memory 706. The transceiver 708 is configured to transmit and receive signals 616 from the vehicle 602 and the other vehicle 704 or vehicles. In some examples, the transceiver 708 transmits the escape route plan 200 and/or current or updated data 302 to the vehicle 602 for storage in the memory 612 of the vehicle 602. In an example, the escape route plan 200 is modified or updated by the ground station 702 using the current or updated data 302 and then the updated or modified escape route plan 414 is transmitted to the vehicle 602. In another example, the vehicle 602 receives the current or updated data 302 from the ground station 702 and the vehicle 602 modifies or updates the escape route plan 200 similar to that previously described.

The other vehicle 704 includes a memory 710 and a transceiver 712. In some examples, the escape route plan 200 is stored in the memory 710 of the other vehicle 704 and transmitted to the vehicle 602 by the transceiver 712. Current or updated data 302 may also be stored in the memory 710 of the other vehicle 704 and transmitted to the vehicle 602 for modifying or updating the escape route plan 200 by the vehicle 602. In some examples, the other vehicle 704 is configured to update or modify the escape route plan 200 and to transmit the updated or modified escape route plan 414 to the vehicle 602.

Further, the disclosure comprises examples according to the following clauses:

Clause 1. A method, comprising:

separating a flight plan of a vehicle into a number of portions with each portion including a particular length that is determined based on a complexity of an environment where the flight plan takes place, wherein the complexity of the environment is based on at least one of a set of factors within the environment, the set of factors comprising at least one of a terrain of the environment, one or more obstacles, one or more no-fly zones, or one or more no-landing zones within the environment;

determining, by a processor, an escape route for each portion of the flight plan of the vehicle, the escape route comprises a route to a safe landing site in response to a failure of a system onboard the vehicle that requires the vehicle to land, drop a payload or both; and generating, by the processor, an escape route plan for the flight plan in response to all portions of the flight plan being assigned at least one escape route.

Clause 2. The method of clause 1, further comprising computing one or more escape route volumes around each landing site of one or more landing sites, wherein determining an escape route for each portion of the flight plan comprises using the one or more escape route volumes.

Clause 3. The method of any of clauses 1 or 2, wherein computing the one or more escape route volumes comprises using one or more of a plurality of inputs, the plurality of inputs comprising at least one of type data indicative of a type of the vehicle, normal performance data indicative of a normal performance model of the vehicle, degraded performance data indicative of a degraded performance model of the vehicle, first location data indicative of a location of a landing site, second location data indicative of a location of a no-fly-zone, third location data indicative of a location of a payload drop site to extend remaining battery power for operation of the vehicle, obstacle data, a micro weather forecast data, historical data associated with a history of micro weather, battery condition information, a deviation between planned and actual conditions during flight, or an uncertainty of any of the inputs.

Clause 4 The method of any of clauses 1-2, or 3, wherein the determining the escape route for each portion of the flight plan comprises determining at least one four-dimensional (4D) escape route for each portion of the flight plan.

Clause 5. The method of any of clauses 1-3, or 4, wherein the at least one 4D escape route comprises a volume defined by the portion of the flight plan and at least one closest landing site to the portion of the flight plan, changes to the volume as the vehicle moves along the portion of the flight plan, uncertainty in the plurality of inputs and deviation from the flight plan.

Clause 6. The method of any of clauses 1-4, or 5, further comprising determining the flight plan of the vehicle using a set of navigation data.

Clause 7. The method of any of clauses 1-5, or 6, wherein the set of navigation data is indicative of at least one of a defined airway, a location of a suitable regular landing site, a location of a suitable emergency landing site, a location of a no-fly-zone, one or more no-landing zones, one or more payload drop sites, or a database of obstacles.

Clause 8. The method of any of clauses 1-6, or 7, further comprising rerouting a particular portion of the flight plan in response to the particular portion not having an assigned escape route.

Clause 9. The method of any of clauses 1-7, or 8, wherein rerouting the particular portion of the flight plan comprises rerouting the particular portion of the flight plan closer to a suitable landing site.

Clause 10. The method of any of clauses 1-8, or 9, further comprising:

receiving current or updated data; and modifying the escape route plan based on the current or updated data.

Clause 11. The method of any of clauses 1-9, or 10, wherein the current or updated data is received by the vehicle and the escape route plan is modified by the vehicle.

Clause 12. The method of any of clauses 1-10, or 11, wherein the current or updated data is received by at least one of a ground station or another vehicle and the escape route plan is modified by at least one of the ground station or the other vehicle, the method further comprising transmitting a modified escape route plan to the vehicle.

Clause 13. The method of any of clauses 1-11, or 12, wherein the current or updated data comprises at least one of a change in a location of a landing site, a change in a location of a no-fly-zone, a change in a location of a payload drop site, a change in a database comprising obstacles, a change in a micro weather forecast, or a deviation between planned and actual conditions during flight.

Clause 14. The method of any of clauses 1-12, or 13, further comprising executing the escape route plan in response to detecting a failure of a system onboard the vehicle that requires the vehicle to land, drop a payload or both.

Clause 15. The method of any of clauses 1-13, or 14, wherein executing the escape route plan comprises landing the vehicle at a closest landing site based on the escape route plan.

Clause 16. The method of any of clauses 1-14, or 15, wherein executing the escape route plan comprises:

dropping a payload at a payload drop site based on a condition of the vehicle and the escape route plan; and landing the vehicle at a closest landing site based on the escape route plan.

Clause 17. The method of any of clauses 1-15, or 16, further comprising:

detecting a change in health of the vehicle; and modifying the escape route plan in response to detecting the change in the health of the vehicle, wherein modifying the escape route plan comprises modifying at least one of a particular escape route or a particular portion of the flight plan and an assigned escape route.

Clause 18. The method of any of clauses 1-16, or 17, wherein modifying the escape route plan is performed by the vehicle.

Clause 19. The method of any of clauses 1-17, or 18, wherein modifying the escape route plan is performed by a ground station or another vehicle.

Clause 20. The method of any of clauses 1-18, or 19, further comprising:

detecting a change in an environment associated with the flight plan; and modifying the escape route plan in response to detecting the change in the environment, wherein modifying the escape route plan comprises modifying at least one of a particular escape route or a particular portion of the flight plan and an assigned escape route.

Clause 21. The method of any of clauses 1-19, or 20, wherein modifying the escape route plan is performed by the vehicle.

Clause 22. The method of any of clauses 1-20, or 21, wherein modifying the escape route plan is performed by a ground station or another vehicle.

Clause 23. The method of any of clauses 1-21, or 22, wherein the vehicle is an unmanned aerial vehicle.

Clause 24. A system, comprising:
a processor; and
a memory associated with the processor, the memory comprising computer-readable program instructions that, when executed by the processor causes the processor to perform a set of functions comprising:
separating a flight plan of a vehicle into a number of portions with each portion including a particular length that has been determined based on a complexity of an environment where the flight plan takes place, wherein the complexity of the environment is based on at least one of a set of factors within the environment, the set of factors comprising at least one of a terrain of the environment, one or more obstacles, one or more no-fly zones, or one or more no-landing zones within the environment;
determining an escape route for each portion of the flight plan of the vehicle, the escape route comprises a route to a safe landing site in response to a failure of a system onboard the vehicle that requires the vehicle to land, drop a payload or both; and
generating an escape route plan for the flight plan in response to all portions of the flight plan being assigned at least one escape route.

Clause 25. The system of clause 24, further comprising computing one or more escape route volumes around each landing site of one or more landing sites, wherein determining an escape route for each portion of the flight plan comprises using the one or more escape route volumes.

Clause 26. The system of any of clauses 24 or 25, wherein computing the one or more escape route volumes comprises using one or more of a plurality of inputs, the plurality of inputs comprising at least one of type data indicative of a type of the vehicle, normal performance data indicative of a normal performance model of the vehicle, degraded performance data indicative of a degraded performance model of the vehicle, first location data indicative of a location of a landing site, second location data indicative of a location of a no-fly-zone, third location data indicative of a location of a payload drop site to extend remaining battery power for operation of the vehicle, obstacle data, a micro weather forecast data, historical data associated with a history of micro weather, battery condition information, a deviation between planned and actual conditions during flight, or an uncertainty of any of the inputs.

Clause 27 The system of any of clauses 24-25, or 26, wherein the determining the escape route for each portion of the flight plan comprises determining at least one four-dimensional (4D) escape route for each portion of the flight plan.

Clause 28. The system of any of clauses 24-26, or 27, wherein the at least one 4D escape route comprises a volume defined by the portion of the flight plan and at least one closest landing site to the portion of the flight plan, changes to the volume as the vehicle moves along the portion of the flight plan, uncertainty in the plurality of inputs and deviation from the flight plan.

Clause 29. The system of any of clauses 24-27, or 28, further comprising determining the flight plan of the vehicle using a set of navigation data.

Clause 30. The system of any of clauses 24-28, or 29, wherein the set of navigation data is indicative of at least one of a defined airway, a location of a suitable regular landing site, a location of a suitable emergency landing site, a location of a no-fly-zone, one or more no-landing zones, one or more payload drop sites, or a database of obstacles.

Clause 31. The system of any of clauses 24-29, or 30, further comprising rerouting a particular portion of the flight plan in response to the particular portion not having an assigned escape route.

Clause 32. The system of any of clauses 24-30, or 31, wherein rerouting the particular portion of the flight plan comprises rerouting the particular portion of the flight plan closer to a suitable landing site.

Clause 33. The system of any of clauses 24-31, or 32, further comprising:
receiving current or updated data; and
modifying the escape route plan based on the current or updated data.

Clause 34. The system of any of clauses 24-32, or 33, wherein the current or updated data is received by the vehicle and the escape route plan is modified by the vehicle.

Clause 35. The system of any of clauses 24-33, or 34, wherein the current or updated data is received by at least one of a ground station or another vehicle and the escape route plan is modified by at least one of the ground station or the other vehicle, the method further comprising transmitting a modified escape route plan to the vehicle.

Clause 36. The system of any of clauses 24-34, or 35, wherein the current or updated data comprises at least one of a change in a location of a landing site, a change in a location of a no-fly-zone, a change in a location of a payload drop site, a change in a database comprising obstacles, a change in a micro weather forecast, or a deviation between planned and actual conditions during flight.

Clause 37. The system of any of clauses 24-35, or 36, further comprising executing the escape route plan in response to detecting a failure of a system onboard the vehicle that requires the vehicle to land, drop a payload or both.

Clause 38. The system of any of clauses 24-36, or 37, wherein executing the escape route plan comprises landing the vehicle at a closest landing site based on the escape route plan.

Clause 39. The system of any of clauses 24-37, or 38, wherein executing the escape route plan comprises:
dropping a payload at a payload drop site based on a condition of the vehicle and the escape route plan; and
landing the vehicle at a closest landing site based on the escape route plan.

Clause 40. The system of any of clauses 24-38, or 39, further comprising:
detecting a change in health of the vehicle; and
modifying the escape route plan in response to detecting the change in the health of the vehicle, wherein modifying the escape route plan comprises modifying at least one of a particular escape route or a particular portion of the flight plan and an assigned escape route.

Clause 41. The system of any of clauses 24-39, or 40, wherein modifying the escape route plan is performed by the vehicle.

Clause 42. The system of any of clauses 24-40, or 41, wherein modifying the escape route plan is performed by a ground station or another vehicle.

Clause 43. The system of any of clauses 24-41, or 42, further comprising:
    detecting a change in an environment associated with the flight plan; and
    modifying the escape route plan in response to detecting the change in the environment, wherein modifying the escape route plan comprises modifying at least one of a particular escape route or a particular portion of the flight plan and an assigned escape route.

Clause 44. The system of any of clauses 24-42, or 43, wherein modifying the escape route plan is performed by the vehicle.

Clause 45. The system of any of clauses 24-43, or 44, wherein modifying the escape route plan is performed by a ground station or another vehicle.

Clause 46. The system of any of clauses 24-44, or 45, wherein the vehicle is an unmanned aerial vehicle.

The flowchart and block diagrams in the Figures illustrate the architecture, functionality, and operation of possible implementations of systems, methods, and computer program products according to various examples of the subject disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular examples only and is not intended to be limiting of examples of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present examples has been presented for purposes of illustration and description, but is not intended to be exhaustive or limited to examples in the form disclosed. Many modifications and variations will be apparent to those of ordinary skill in the art without departing from the scope and spirit of examples.

Although specific examples have been illustrated and described herein, those of ordinary skill in the art appreciate that any arrangement which is calculated to achieve the same purpose may be substituted for the specific examples shown and that the examples have other applications in other environments. This application is intended to cover any adaptations or variations. The following claims are in no way intended to limit the scope of examples of the disclosure to the specific examples described herein.

What is claimed is:

1. A method, comprising:
    separating, by a processor, a flight plan of a vehicle into a number of portions with each portion including a particular length that is determined based on a complexity of an environment where the flight plan takes place, wherein the complexity of the environment is based on at least one of a set of factors within the environment, the set of factors comprising at least one of a terrain of the environment, one or more obstacles, one or more no-fly zones, or one or more no-landing zones within the environment;
    determining, by the processor, an escape route for each portion of the flight plan of the vehicle, the escape route comprises a route to a safe landing site in response to a failure of a system onboard the vehicle that requires the vehicle to land, drop a payload or both, wherein the determining the escape route for each portion of the flight plan comprises determining at least one four-dimensional (4D) escape route for each portion of the flight plan and wherein the at least one 4D escape route comprises a volume defined by the portion of the flight plan and at least one closest landing site to the portion of the flight plan, changes to the volume occur as the vehicle moves along the portion of the flight plan and because of uncertainty in a plurality of inputs for computing one or more escape route volumes and deviation from the flight plan;
    generating, by the processor, an escape route plan for the flight plan in response to all portions of the flight plan being assigned at least one escape route; and
    executing the escape route plan in response to detecting the failure of the system onboard the vehicle that requires the vehicle to land, drop the payload or both.

2. The method of claim 1, further comprising computing the one or more escape route volumes around each landing site of one or more landing sites, wherein determining an escape route for each portion of the flight plan comprises using the one or more escape route volumes.

3. The method of claim 2, wherein computing the one or more escape route volumes comprises using one or more of the plurality of inputs, the plurality of inputs comprising at least one of type data indicative of a type of the vehicle, normal performance data indicative of a normal performance model of the vehicle, degraded performance data indicative of a degraded performance model of the vehicle, first location data indicative of a location of a landing site, second location data indicative of a location of a no-fly-zone, third location data indicative of a location of a payload drop site to extend remaining battery power for operation of the vehicle, obstacle data, a micro weather forecast data, historical data associated with a history of micro weather, battery condition information, a deviation between planned and actual conditions during flight, or an uncertainty of any of the inputs.

4. The method of claim 1, further comprising determining the flight plan of the vehicle using a set of navigation data.

5. The method of claim 4, wherein the set of navigation data is indicative of at least one of a defined airway, a location of a suitable regular landing site, a location of a suitable emergency landing site, a location of a no-fly-zone, one or more no-landing zones, one or more payload drop sites, or a database of obstacles.

6. The method of claim 1, further comprising rerouting a particular portion of the flight plan in response to the particular portion not having an assigned escape route.

7. The method of claim 6, wherein rerouting the particular portion of the flight plan comprises rerouting the particular portion of the flight plan closer to a suitable landing site.

8. The method of claim 1, further comprising:
receiving current or updated data; and
modifying the escape route plan based on the current or updated data.

9. The method of claim 8, wherein the current or updated data is received by the vehicle and the escape route plan is modified by the vehicle.

10. The method of claim 8, wherein the current or updated data is received by at least one of a ground station or another vehicle and the escape route plan is modified by at least one of the ground station or the other vehicle, the method further comprising transmitting a modified escape route plan to the vehicle.

11. The method of claim 8, wherein the current or updated data comprises at least one of a change in a location of a landing site, a change in a location of a no-fly-zone, a change in a location of a payload drop site, a change in a database comprising obstacles, a change in a micro weather forecast, or a deviation between planned and actual conditions during flight.

12. The method of claim 1, wherein executing the escape route plan comprises landing the vehicle at a closest landing site based on the escape route plan.

13. The method of claim 1, wherein executing the escape route plan comprises:
dropping a payload at a payload drop site based on a condition of the vehicle and the escape route plan; and
landing the vehicle at a closest landing site based on the escape route plan.

14. The method of claim 1, further comprising:
detecting at least one of a change in health of the vehicle or a change in an environment associated with the flight plan; and
modifying the escape route plan in response to detecting the change in the health of the vehicle or the change in the environment associated with the flight plan, wherein modifying the escape route plan comprises modifying at least one of a particular escape route or a particular portion of the flight plan and an assigned escape route.

15. The method of claim 14, wherein modifying the escape route plan is performed by one of the vehicle, a ground station or another vehicle.

16. A system, comprising:
a processor; and
a memory associated with the processor, the memory comprising computer-readable program instructions that, when executed by the processor causes the processor to perform a set of functions comprising:
separating a flight plan of a vehicle into a number of portions with each portion including a particular length that has been determined based on a complexity of an environment where the flight plan takes place, wherein the complexity of the environment is based on at least one of a set of factors within the environment, the set of factors comprising at least one of a terrain of the environment, one or more obstacles, one or more no-fly zones, or one or more no-landing zones within the environment;
determining an escape route for each portion of the flight plan of the vehicle, the escape route comprises a route to a safe landing site in response a failure of a system onboard the vehicle that requires the vehicle to land, drop a payload or both, wherein the determining the escape route for each portion of the flight plan comprises determining at least one four-dimensional (4D) escape route for each portion of the flight plan and wherein the at least one 4D escape route comprises a volume defined by the portion of the flight plan and at least one closest landing site to the portion of the flight plan, changes to the volume occur as the vehicle moves along the portion of the flight plan and because of uncertainty in a plurality of inputs for computing one or more escape route volumes and deviation from the flight plan;
generating an escape route plan for the flight plan in response to all portions of the flight plan being assigned at least one escape route; and
executing the escape route plan in response to detecting the failure of the system onboard the vehicle that requires the vehicle to land, drop the payload or both.

17. The system of claim 16, wherein the set of functions further comprises computing the one or more escape route volumes around each landing site of one or more landing sites, wherein determining an escape route for each portion of the flight plan comprises using the one or more escape route volumes.

18. The system of claim 16, wherein current or updated data is received by the vehicle and the escape route plan is modified by the vehicle.

19. The system of claim 16, wherein current or updated data is received by at least one of a ground station or another vehicle and the escape route plan is modified by at least one of the ground station or the other vehicle, and wherein the modified escape route plan is transmitted by the ground station or the other vehicle to the vehicle.

20. The system of claim 19, wherein the current or updated data comprises at least one of a change in a location of a landing site, a change in a location of a no-fly-zone, a change in a location of a payload drop site, a change in a database comprising obstacles, a change in a micro weather forecast, or a deviation between planned and actual conditions during flight.

* * * * *